(12) United States Patent
Isobe et al.

(10) Patent No.: US 8,285,257 B2
(45) Date of Patent: Oct. 9, 2012

(54) EMOTION RECOGNITION MESSAGE SYSTEM, MOBILE COMMUNICATION TERMINAL THEREFOR AND MESSAGE STORAGE SERVER THEREFOR

(75) Inventors: Shin-ichi Isobe, Kanagawa (JP); Masami Yabusaki, Chiba (JP)

(73) Assignee: NTT DoCoMo, Inc., Tokyo (JP)

( * ) Notice: Subject to any disclaimer, the term of this patent is extended or adjusted under 35 U.S.C. 154(b) by 594 days.

(21) Appl. No.: 12/418,123

(22) Filed: Apr. 3, 2009

(65) Prior Publication Data

US 2010/0003969 A1 Jan. 7, 2010

(51) Int. Cl.
 *H04M 1/725* (2006.01)

(52) U.S. Cl. ............... 455/412.2; 455/412.1; 455/414.1; 455/415; 455/466; 455/586

(58) Field of Classification Search .................. None
See application file for complete search history.

(56) References Cited

U.S. PATENT DOCUMENTS

| 7,224,851 | B2 * | 5/2007 | Kinjo | 382/276 |
| 7,451,084 | B2 * | 11/2008 | Funakura | 704/235 |
| 7,921,369 | B2 * | 4/2011 | Bill | 715/753 |
| 2002/0002460 | A1 | 1/2002 | Pertrushin | |
| 2005/0004923 | A1 * | 1/2005 | Park | 707/100 |
| 2006/0281064 | A1 | 12/2006 | Sato et al. | |
| 2008/0096532 | A1 * | 4/2008 | Lyle et al. | 455/412.1 |
| 2009/0055484 | A1 * | 2/2009 | Vuong et al. | 709/206 |
| 2009/0063154 | A1 * | 3/2009 | Gusikhin et al. | 704/260 |
| 2010/0088088 | A1 * | 4/2010 | Bollano et al. | 704/201 |
| 2011/0093272 | A1 * | 4/2011 | Isobe et al. | 704/258 |
| 2011/0282646 | A1 * | 11/2011 | Bill | 704/3 |

FOREIGN PATENT DOCUMENTS

| JP | 2006-277567 A | 10/2006 |
| JP | 2006-330958 A | 12/2006 |
| JP | 2007-49657 A | 2/2007 |
| JP | 2007-184987 A | 7/2007 |
| JP | 2007-193824 A | 8/2007 |

OTHER PUBLICATIONS

Search Report for European Application No. 09156781.8, dated Aug. 7, 2009, 3 pages.

* cited by examiner

*Primary Examiner* — Willie J Daniel, Jr.

(57) ABSTRACT

A message storage server stores a message by speech or video transmitted from a mobile communication terminal and performs emotion recognition on the message to generate emotion data. A mobile communication terminal, upon receiving a confirmation request from the message storage server of a message which the mobile communication terminal has transmitted as a message for another mobile communication terminal, displays the emotion data assigned to the transmitted message on its display.

10 Claims, 6 Drawing Sheets

| MESSAGE DATA | REGISTERED TIME | ORIGINATOR | TOTAL PLAYING TIME | EMOTION DATA | RECOGNITION POINT |
|---|---|---|---|---|---|
| 00000003 | 2007/11/1 23:15 | A | 60s | HAPPINESS | 24s |
| 00000002 | 2007/10/24 14:12 | X | 30s | ANGER | 7s |
| 00000001 | 2007/10/22 8:43 | Y | 300s | HAPPINESS | 180s |
| | | | | | |

FIG. 5

EMOTION RECOGNITION MESSAGE SYSTEM, MOBILE COMMUNICATION TERMINAL THEREFOR AND MESSAGE STORAGE SERVER THEREFOR

RELATED APPLICATIONS

This application claims priority under 35 U.S.C. §119 to Japanese Patent Application No. JP2008-099750 filed on Apr. 7, 2008, the entire content of which is hereby incorporated by reference.

BACKGROUND

1. Field of the Invention

The present invention relates to a message system for a communication terminal and relates specifically to a system for conveying messages such as speech or video via a server.

2. Description of Related Art

Generally, in a voice message service for a mobile communication system for portable phones, a caller terminal can leave a message by speech or video in a server in a case in which the caller called a receiver terminal but could not reach the receiver for some reason. The receiver terminal receives a notification from the server that the message was registered, so that the receiver terminal connects to the server to receive the message. The caller terminal can thus convey a message from its user to a user of the receiver terminal even if the user of the caller terminal cannot directly communicate with the user of the receiver side.

However, in the voice message service, it is more difficult for a user of the caller terminal to express emotions compared with a case in which the user can directly talk to the user of the receiver. The range of emotional expressions by body language or by tone of voice will inevitably be less in a situation in which a human talks to the machine without the presence of the corresponding party, and even more so in a case in which a message does not include video and only contains speech. As a result, the emotion intended by the caller sometimes is not fully reflected in the message left in a voice message.

To solve this problem, a mobile communication system is known in which a caller terminal can append information indicating a type of emotion input by a user to a speech message for a receiver, and the receiver terminal can receive a message with emotion information before receiving the speech message (for example, see Japanese Patent Application Laid-Open Publication No. 2007-184987 (Abstract, section [0023]).

Also known is a phone answering machine capable of determining emotions of a caller based on the speech signals in a voice message and capable of controlling the order of message playing in accordance with the degree of importance of the received voice message or with a value indicating the degree of emotion (for example, see Japanese Patent Application Laid-Open Publication No. 2007-049657 (Abstract)).

There is also known an image processing system in which, in an image message, the facial expressions of a shot image are determined, so that a component to be emphasized is visualized for use in videophones (for example, see Japanese Patent Application Laid-Open Publication No. 2007-193824 (Abstract)).

Furthermore, there is known a communication system that has a chat server that detects emotion parameters based on speech data and image data, to generate emotion data, that generates synthesized facial expression data by synthesizing the emotion data with facial expression data extracted from image data, and that generates a character synthesis image by synthesizing character data with the synthesized facial expression data (for example, see Japanese Patent Application Laid-Open Publication No. 2006-330958 (Abstract)).

In addition, a portable phone is known that is capable of generating an email by performing speech emotion recognition on the speech input by a user (for example, see Japanese Patent Application Laid-Open Publication No. 2006-277567 (Abstract)).

However, even in a case in which a user of the caller terminal selects information indicating emotion, the user does not necessarily precisely understand his own emotional state. Therefore, the emotion that the user of the caller terminal intends to convey does not always agree with impression the user of the receiver terminal actually receives when the message is actually conveyed to the receiver user. Conversely, merely reading the emotion of a message automatically by emotion recognition software might give an incorrect impression to a receiver user because a result of the recognition result sometimes does not correspond to the emotion intended by the caller user.

SUMMARY OF THE INVENTION

The present invention has been achieved to solve the problem stated above, and the present invention has as an object to provide a message system, a mobile communication terminal, and a message storage server for enabling smoother communication between users of a transmitter and a receiver terminal, without placing an excessive processing load on the terminals.

In one aspect, the present invention provides a message system having a message storage server and at least two mobile communication terminals, and each of the at least two mobile communication terminals has: a transmitter-receiver that transmits data to, and receives data from, the message storage server; a display that displays an image; an input receiver that receives input of speech or video from a user; and a controller that controls each unit, and the controller, in a case in which a message by speech or video for another mobile communication terminal is received by the input receiver, transmits the message to the message storage server via the transmitter-receiver; and the message storage server has: a message receiver that receives, from the mobile communication terminal, the message for the another mobile communication terminal; a storage device that stores the message received by the message receiver; an emotion recognizer that performs emotion recognition on the message and that assigns emotion data indicating the recognized emotion to the message; and a confirmation request transmitter that transmits, as a confirmation request, emotion data assigned by the emotion recognizer to the mobile communication terminal that has transmitted the message, and the controller, upon receiving from the message storage server the confirmation request, displays an image corresponding to the received emotion data on the display.

According to the message system of the present invention, since a confirmation request of emotion data is transmitted to a terminal that has transmitted a message, a user of the transmitter terminal is able to confirm whether emotion recognized by the emotion recognizer of the message storage server corresponds to the emotion intended by the user. As a result, a discrepancy between the recognized emotion data and the intention of the user can be minimized, and the reliability of a message storage service in a mobile communication system is enhanced.

Furthermore, since emotion recognition is performed by a message storage server, a mobile communication terminal does not have to be provided with an emotion recognition function. Therefore, the processing load placed on communication terminals can be minimized, yet emotion data that suits the intention of a user of the transmitter terminal can be assigned to a message.

In the present invention the message by speech or video is a speech message or a video message. Therefore, a speech message includes audio data, and a video message includes both audio and video data.

In another aspect, the present invention provides a mobile communication terminal that connects to a mobile communication system having a message storage server and that communicates with another mobile communication terminal, and the mobile communication terminal has: a transmitter-receiver that transmits data to, and receives data from, the message storage server for registering a message by speech or video received from the mobile communication terminal after performing emotion recognition on the received message and assigning emotion data indicating the recognized emotion to the received message; a display that displays an image; an input receiver that receives input of speech or video from a user; and a controller that controls each unit, and the controller, in a case in which a message by speech or video for another mobile communication terminal is received by the input receiver, transmits the message to the message storage server via the transmitter-receiver; the controller, upon receiving, as a confirmation request, emotion data for the transmitted message from the message storage server, displays an image corresponding to the received emotion data on the display; and the controller, upon receiving, via the input receiver, an input instruction indicating that the user agrees with the type of emotion indicated by the image displayed on the display, transmits via the transmitter-receiver to the message storage server an approval response indicating approval to the emotion data. According to the mobile communication terminal of the present invention, the same effects as the above message system can be attained.

In a preferred embodiment, the controller, upon receiving via the transmitter-receiver from the message storage server a registration notification that notifies registration of a message for the mobile communication terminal in the message storage server, may transmit an access request for the registered message via the transmitter-receiver to the message storage server; and the controller, upon receiving via the transmitter-receiver from the message storage server, screen data representing a selection screen that displays message information indicating attributes of the registered message, may display the selection screen represented by the screen data on the display, the selection screen displaying the message information of at least one message that can be downloaded by the mobile communication terminal, with the message information being displayed after being sorted according to a type of emotion indicated by the emotion data of the message; and the controller, when one of the at least one message is selected from the selection screen, may transmit a download request for the selected message to the message storage server.

According to the present embodiment, each message is displayed under categories of different types of emotion on a selection screen. Therefore, the selection of a message to be downloaded can be easily performed by a user.

In another preferred embodiment, the controller, upon receiving via the transmitter-receiver from the message storage server a registration notification that notifies registration of a message for the mobile communication terminal in the message storage server, may transmit an access request for the registered message via the transmitter-receiver to the message storage server; the controller, upon receiving via the transmitter-receiver from the message storage server, screen data representing a selection screen that displays message information of at least one message that can be downloaded by the mobile communication terminal, with the message information indicating attributes of the registered message, may display the selection screen represented by the screen data on the display, the message information including an image that best represents emotion indicated by the emotion data assigned to the message; and the controller, when one of the at least one message is selected from the selection screen, may transmit a download request for the selected message to the message storage server.

Preferably, in the selection screen, the message information of the at least one message that can be downloaded by the mobile communication terminal is displayed after being sorted according to a type of emotion indicated by the emotion data of each message.

In this case, since an image that best represents the distinctive emotion of a message is displayed in a selection screen at a receiver terminal, such a selection screen gives easy reference to a user of the receiver terminal as to what type of emotion a received message is associated with. Furthermore, in a case in which the messages are sorted according to a type of emotion, convenience to the user is further enhanced.

In still another aspect, the present invention provides a message storage server of a mobile communication system for relaying communication between at least two mobile communication terminals, and the message storage server has: a message receiver that receives from a first mobile communication terminal a message by speech or video for a second mobile communication terminal; a storage device that stores the message received by the message receiver; an emotion recognizer that performs emotion recognition on the message and that assigns emotion data indicating the recognized emotion to the message; and a confirmation request transmitter that transmits, as a confirmation request, emotion data assigned by the emotion recognizer to the first mobile communication terminal that has transmitted the message.

According to the message storage server of the present invention, the same effects as the above message system can be attained.

In a preferred embodiment, the message storage server may have a registration notifier that, upon receiving from the first mobile communication terminal an approval response indicating approval of the emotion data, transmits to the second mobile communication terminal a registration notification of the message that corresponds to the approved emotion data and that is stored in the storage device.

In this mode of the invention, since reception of a message is not notified to a receiver terminal unless emotion data is approved by a transmitter terminal, a user of the receiver terminal has an access to a message stored in the server only in a case in which emotion data is confirmed by the transmitter. Therefore, emotion data that is separate from the intention of the user of a transmitter will not be transmitted to the receiver.

In another preferred embodiment, the message storage server may further have a first generator that, upon receiving an access request from the second mobile communication terminal as a response to the registration notification, generates screen data representing a selection screen that displays message information indicating attributes of the stored message; and a screen data transmitter that transmits the screen data generated by the first generator to the second mobile communication terminal, and the first generator may generate, as the selection screen, a screen that displays the message information of the message that can be downloaded by the second mobile communication terminal, after sorting the message information according to a type of emotion indicated by the emotion data of the message.

According to this mode of the invention, each message is displayed under one of the categories of different types of emotion in a selection screen. Therefore, the selection of a message to be downloaded can be easily performed by a user. Additionally, since the message storage server generates such a selection screen in response to an access request from a receiver communication terminal to transmit screen data representing the generated selection screen to the receiver terminal, the receiver terminal does not have to generate the screen data. Therefore, the burden placed on the receiver terminal can be minimized.

Alternatively, the message storage server may further have an image extractor that, upon receiving an access request from the second mobile communication terminal in response to the registration notification, extracts from the video data of the message an image that best represents the emotion indicated by the emotion data corresponding to the message, in a case in which the stored message is a message by video; a second generator that generates screen data representing a selection screen that displays an image extracted by the image extractor as at least a part of message information indicating attributes of the stored message; and a screen data transmitter that transmits the screen data generated by the second generator to the second mobile communication terminal.

Preferably, the second generator may generate, as the selection screen, a screen that displays the message information of the message that can be downloaded by the second mobile communication terminal, after sorting the message information according to a type of emotion indicated by the emotion data of the message.

In this case, since an image that best represents the distinctive emotion of a message is displayed in a selection screen at a receiver terminal, such a selection screen gives easy reference to a user of the receiver terminal as to what type of emotion a received message is associated with. Furthermore, since for video messages, an image to be displayed on the selection screen is extracted from the original video message, the individual characteristics of a user of the transmitter terminal can be included as attribute information of a message displayed on the selection screen. Additionally, since the message storage server generates such a selection screen in response to an access request from a receiver communication terminal, to transmit screen data representing the generated selection screen to the receiver terminal, the receiver terminal does not have to generate the screen data. Therefore, the burden placed on the receiver terminal can be minimized.

In a case in which the messages are sorted according to type of emotion, convenience to the user is further enhanced.

EFFECTS OF THE INVENTION

According to the present invention, a user of a transmitter terminal of a message can confirm whether emotion data assigned to the message by an emotion recognizer suits the intention of the user. Therefore, a message system for enabling smoother communication between a transmitter and a receiver terminal can be provided without placing an excessive processing load on the terminals.

DETAILED DESCRIPTION OF THE PREFERRED EMBODIMENTS

Description will now be given of an emotion recognition message system according to an embodiment of the present invention, with reference to the attached drawings.

Figure 1:
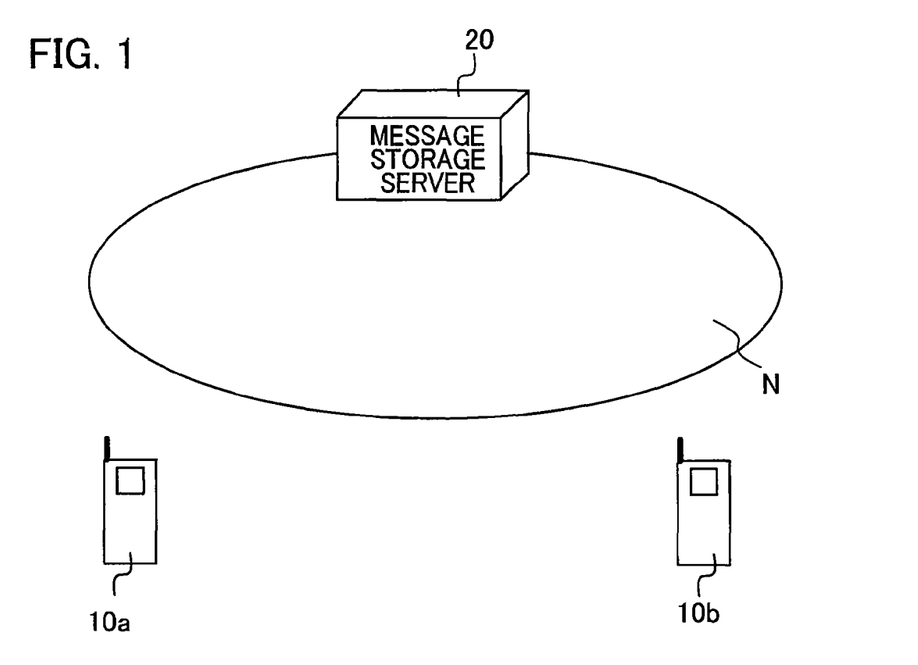
FIG. 1 is a diagram showing a configuration of an emotion recognition message system according to an embodiment of the present invention.

Description will be first given of a configuration of a message system provided with an emotion recognition function according to the present embodiment. FIG. 1 is a diagram showing a configuration of the message system according to the present embodiment. As shown in the figure, the message system has communication terminals 10a, 10b for transmitting and receiving a speech or video message (a message by speech or by video), a message storage server 20 for storing speech or video messages transmitted from communication terminals 10a, 10b, and a network N that connects communication terminals 10a, 10b and message storage server 20. Communication terminal 10a, 10b is, for example, a mobile communication terminal, but this is not limited thereto. For example, communication terminal 10a, 10b may be a personal computer capable of performing voice communication or IP (Internet Protocol) telephony. However, in this embodiment, description will be given assuming that communication terminal 10a, 10b is a mobile communication terminal. In this case, network N is a mobile communication network. Therefore, although not shown, network N includes base stations as connected points, to which communication terminals 10a, 10b connect wirelessly.

In the following description, for the sake of simplicity, communication terminal 10a will be referred to as a transmitter communication terminal (first mobile communication terminal), and communication terminal 10b will be referred to as a receiver communication terminal (second mobile communication terminal). Furthermore, in this embodiment, we assume that transmitter communication terminal 10a called receiver communication terminal 10b, but the call was not answered by receiver communication terminal 10b, and therefore, transmitter communication terminal 10a will leave a message for receiver communication terminal 10b.

Figure 6:
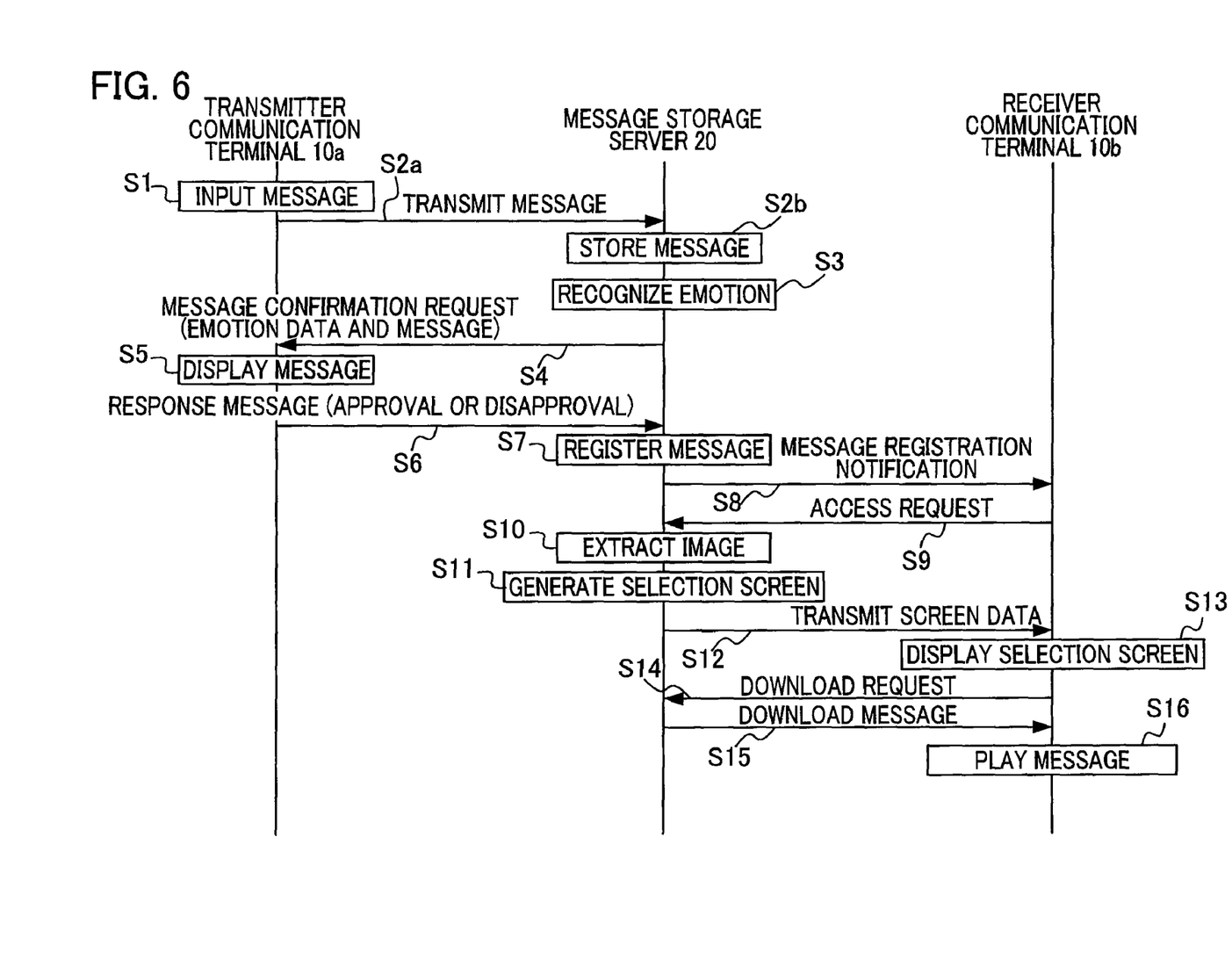
FIG. 6 is a sequence chart showing an operation according to the embodiment of the present invention.

To give a brief overview of the configuration of the present embodiment with reference to the sequence chart shown in FIG. 6, transmitter communication terminal 10a transmits to message storage server 20 a message for receiver communication terminal 10b for storage therein (S1, S2a, S2b). Storage of a message in message storage server 20 triggers an emotion recognition process of the message (S3). As a result of the emotion recognition, emotion data is assigned to the stored message. Message storage server 20 then transmits a confirmation request to transmitter communication terminal 10a (S4). A user of transmitter communication terminal 10a confirms the message of the user along with emotion data assigned by and transmitted from message storage server 20 (S5). In a case in which there is nothing wrong with the message and the emotion data, transmitter communication terminal 10a again connects to message storage server 20 and transmits an approval response to the emotion data (S6).

Registration of a message (S7) triggers a notification process to receiver communication terminal 10b by message storage server 20. In the notification process, message storage server 20 transmits a notification of message registration to receiver communication terminal 10b (S8). Receiver communication terminal 10b that has received the notification transmits an access request to the server (S9), in response to which message storage server 20 generates (S10, S11) and transmits (S12) a selection screen indicating the type of emotion assigned to each of the messages that are downloadable by receiver communication terminal 10b. Receiver communication terminal 10b displays the selection screen (S13) so that a user, by looking at the type of emotion associated with each message on the screen, selects a message to be downloaded. Receiver communication terminal 10b then transmits to message storage server 20 a download request for a message selected by the user (S14). Message storage server 20 then transmits the selected message to receiver communication terminal 10b, for display (S15, S16).

Figure 2:
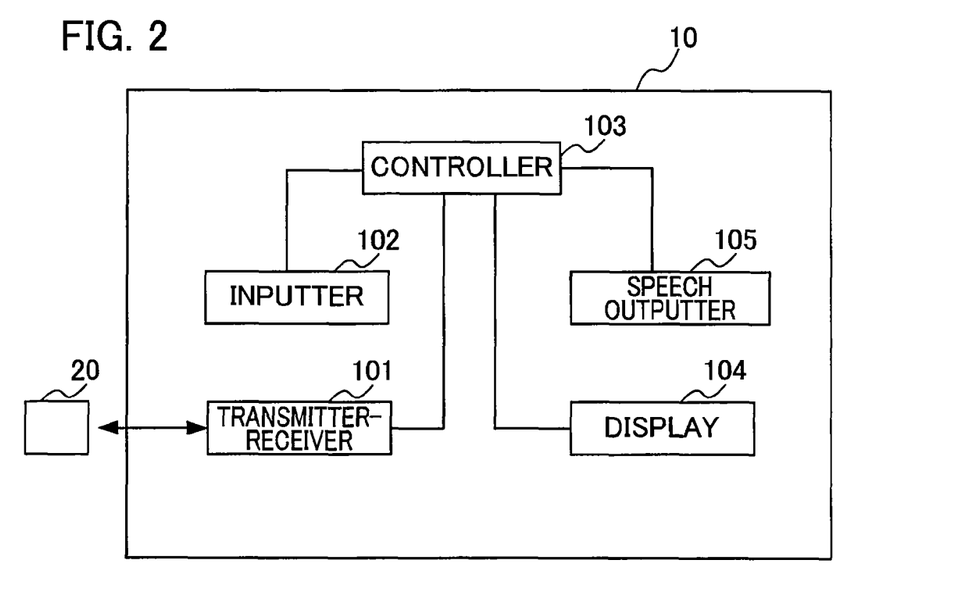
FIG. 2 is a diagram showing a functional configuration of a communication terminal according to the embodiment of the present invention.

FIG. 2 is a block diagram showing a functional configuration of a communication terminal 10 according to the present embodiment. Communication terminal 10 can be either transmitter communication terminal 10a or receiver communication terminal 10b. As shown in the figure, communication terminal 10 has a transmitter-receiver 101, an inputter (input receiver) 102, a controller 103, a display 104, and a speech outputter 105. Transmitter-receiver 101 is for performing wireless communication with message storage server 20 and is, for example, an antenna, but other types of known configurations can be adopted. Display 104 is for displaying images and is, for example, a liquid crystal display screen, but other types of known configurations can be adopted. Inputter 102 includes a key pad for inputting keys, buttons, a microphone for audio input (i.e. obtaining speech for a message by speech and speech for a message by video), and a video camera for obtaining video, but other types of known configurations can be adopted. For example, display 104 is capable of generating input signals based on touched operations to the screen, such inputs through touch operations can be included in inputter 102. Speech outputter 105 generates sounds based on audio data, for output.

Communication terminal 10 is a computer having a CPU (Central Processing Unit), a RAM (Random Access Memory), and a ROM (Read Only Memory) as primary storage devices, a communication module for performing communication, hardware such as a hard disk as an auxiliary storage device, and an operation unit operated by a user of communication terminal 10 (not shown). These elements operate in cooperation with one another, whereby the functions of communication terminal 10 are realized.

Figure 3:
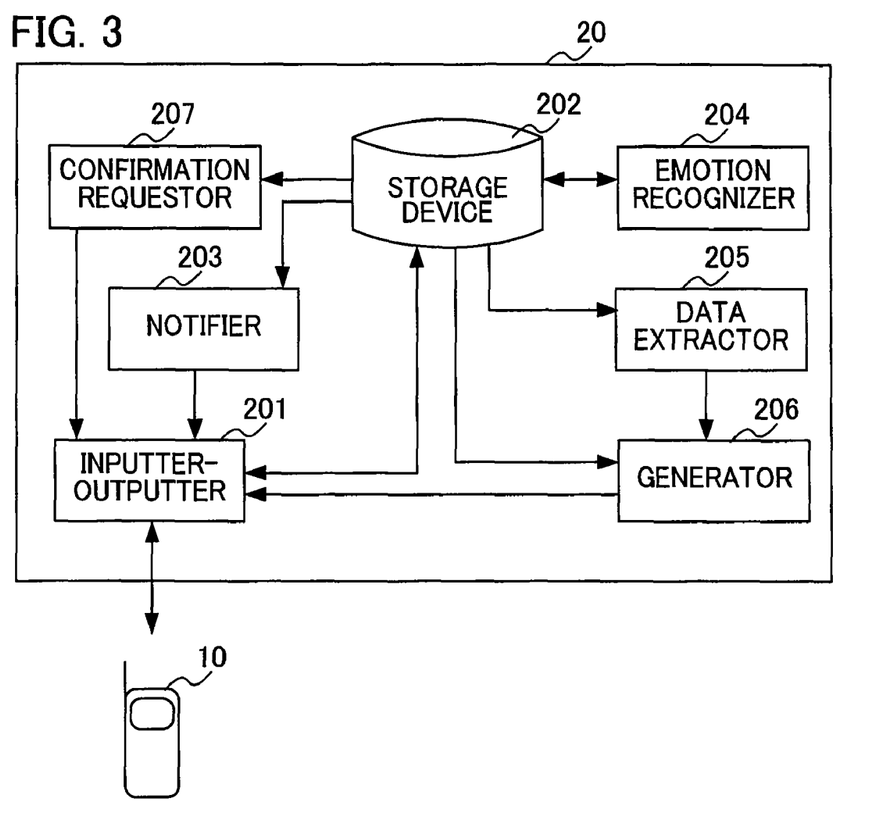
FIG. 3 is a diagram showing a functional configuration of a message storage server according to the embodiment of the present invention.

FIG. 3 is a diagram showing a functional configuration of message storage server 20 according to the present embodiment. As shown in the figure, message storage server 20 has an inputter-outputter 201, a storage device 202, a notifier 203, an emotion recognizer 204, a data extractor 205, a generator 206, and a confirmation requester 207.

Message storage server 20 is a computer having a CPU, a RAM, and a ROM as primary storage devices, a communication module for performing communication, and hardware such as a hard disk as an auxiliary storage device (not shown). These elements operate in cooperation with one another, whereby the functions of message storage server 20 are realized.

Inputter-outputter (a message receiver, a screen data transmitter) 201 is a device for transmitting to, and receiving from, communication terminal 10a, 10b, a speech or video message, and, is, for example, a communication interface. Upon receiving, from transmitter communication terminal 10a, a speech or video message for receiver communication terminal 10b, inputter-outputter 201 transfers the received message to storage device 202. Confirmation requester 207, when emotion data indicating a type of emotion recognized by emotion recognizer 204 is stored in storage device 202, reads the emotion data and data of a corresponding speech or video message from storage device 202, to instruct inputter-outputter 201 to transmit the read pieces of data to transmitter communication terminal 10a as a confirmation request. Inputter-outputter 201, upon receiving the instruction for transmission of the confirmation request from confirmation requestor 207, transmits the confirmation request to transmitter communication terminal 10a. Notifier 203, when a speech or video message from transmitter communication terminal 10a is registered, instructs inputter-outputter 201 to transmit a notification of message (a registration notification). Inputter-outputter 201, upon receiving the instruction for transmission of notification from notifier 203, transmits the notification to receiver communication terminal 10b.

In the description, "registration of a speech or video message" does not mean mere storage of the message into storage device 202, but indicates a situation in which a user of transmitter communication terminal 10a approves a result of emotion recognition performed by emotion recognizer 204 for the stored message. The process of reaching the registration will be described later.

Receiver communication terminal 10b, upon receiving the registration notification, transmits an access request for accessing the registered message to server 20. Inputter-outputter 201, upon receiving screen data generated by generator 206 in response to the access request from receiver communication terminal 10b, transmits the screen data to receiver communication terminal 10b. The screen data is image data of a selection screen to be displayed at receiver communication terminal 10b.

Figure 4:
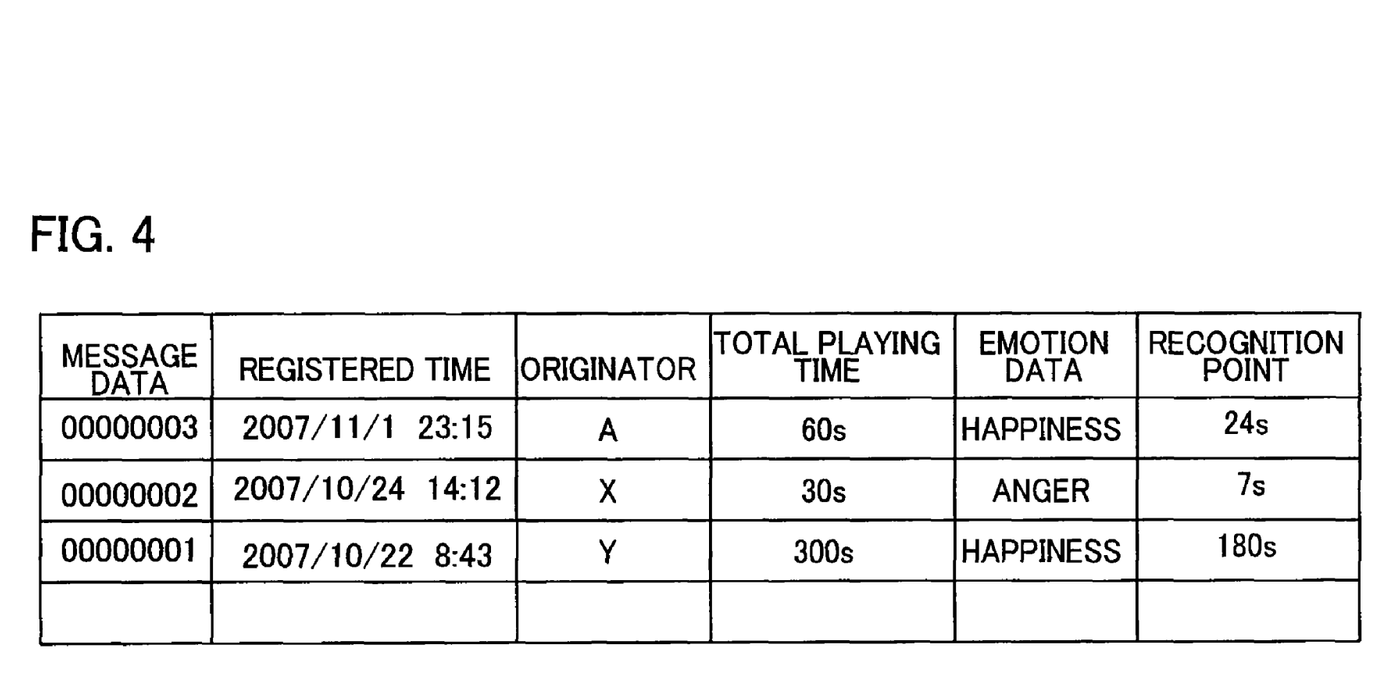
FIG. 4 is a table showing a data configuration in the message storage server according to the embodiment of the present invention.

Storage device 202 stores, in association with data of a speech or video message, a registered time, an originator of the message, a total playing time (i.e., length) of the message, emotion data indicating the most pronounced emotion, and a recognition point of the message at which the emotion is the most pronounced (see FIG. 4 for a data configuration in storage device 202). Storage device 202, upon receiving from inputter-outputter 201 a speech or video message, stores the received message. When emotion recognition is performed for a speech or video message by emotion recognizer 204, storage device 202 stores emotion data generated as a result of the emotion recognition in association with the corresponding speech or video message. The emotion data indicates the most pronounced emotion among different types of emotions recognized by emotion recognition.

Emotion recognizer 204, in a case in which a speech or video message is stored in storage device 202, reads out the message therefrom and recognizes a type of emotion in the message and returns emotion data indicating emotion corresponding to a result of the recognition together with the speech or video message to storage device 201, for storage therein. The recognition of emotion may be performed for every second or for every unit time of the message. The types of emotions that can be recognized include, for example, happiness, surprise, anger, disgust, fear, sadness, etc.

Furthermore, since plural types of emotion can be recognized in one message, the type of emotion that has the highest frequency or the highest parameter value for determining emotion is identified for each speech or video message, so that the identified emotion can be identified as the type of emotion for the speech or video message. It is also possible to store plural pieces of emotion data indicating plural recognized types of emotion in association with the message in storage device 202. However, in the present embodiment, emotion recognizer 204 assigns one piece of emotion data for each message.

As a method for recognizing emotion, a type of emotion is recognized, by storing, for example, in case of speech messages, data on emotional expressions such as "I'm happy" and "I'm sad" or waveform data corresponding to volume, speed, tone, or speech, in association with each of different types of emotion and comparing a speech message input to emotion recognizer 204 with the stored data for each type of emotion. In the case of video messages, emotion can be recognized by extracting facial expressions (for example, positional relationship among feature points in eyebrows, eyes, and mouth) or gestures of the user from the video and comparing the extracted data with data on facial expressions or gestures that are stored in advance in association with different types of emotion. It is to be noted that the emotion recognition of speech data and video data used in the present embodiment can be any other type of known method.

Confirmation requestor (confirmation request transmitter) 207, in a case in which emotion data indicating a type of emotion recognized by emotion recognizer 204 is stored in storage device 202, reads from storage device 202 the emotion data and data of the corresponding speech or video message, and transmits the read pieces of data to transmitter communication terminal 10a as a confirmation request for requesting confirmation as to whether the type of emotion indicated by the emotion data is in accordance with the intention of the user.

Notifier (registration notifier) 203, in a case in which a message is registered in storage device 202 (i.e., it receives an approval response from transmitter communication terminal 10a), generates a message registration notification (a registration notification) to be transmitted to receiver communication terminal 10b, the message registration notification including information on transmitter communication terminal 10a that has registered the speech or video message, a registered time, etc., and instructs inputter-outputter 201 to transmit the generated notification to receiver communication terminal 10b.

Preferably, emotion data that is recognized by emotion recognizer 204 as the most pronounced emotion may be included in the message registration notification.

Data extractor (image extractor) 205, upon receiving an access request from receiver communication terminal 10b, reads from storage device 202 a speech or video message for receiver communication terminal 10b and its corresponding emotion data. In a case in which the read message is video data, data extractor 205 extracts, from video data, an image corresponding to an image of a scene that best shows the type of emotion indicated by the emotion data. The extracted data of an image is passed over to generator 206. In the case of speech data, a set of characters or an image according to the type of the emotion is passed to generator 206.

In extracting an image that best shows the type of emotion indicated by the emotion data, for video messages, data extractor 205 extracts an image of a time point indicated by a recognition point (FIG. 4) for the emotion data stored in storage device 202. Therefore, data extractor 205 also obtains data of a recognition point from storage device 202. For speech messages, data extractor 205 reads a set of characters or an image corresponding to the emotion data from a memory (not shown) in which data of plural sets of characters and images are pre-stored for each type of emotion.

Generator (first generator, second generator) 206, upon receiving image data of a registered message from data extractor 205, first obtains attribute information of the message (message information) from storage device 202, the attribute information including the originator, registered data, total playing time, etc. Generator 206 then, based on the image data and the attribute information, generates screen data representing a screen image that displays one or more messages according to a type of emotion and transfers the screen data to inputter-outputter 201. Specifically, generator 206 generates a selection screen for prompting a user of receiver communication terminal 10b to select a message that the user wishes to download in a case in which, after a registration notification is transmitted from message storage server 20 to receiver communication terminal 10b, receiver communication terminal 10b transmits an access request to server 20 in response. In this case, the selection screen is configured so that, in a case in which a user of receiver communication terminal 10b that has displayed the selection screen clicks one of the displayed images, a download request is automatically transmitted to message storage server 20, the request for downloading a speech or video message corresponding to the clicked image from among stored messages in storage device 202, and that the desired message is then downloaded for playing.

Figure 5:
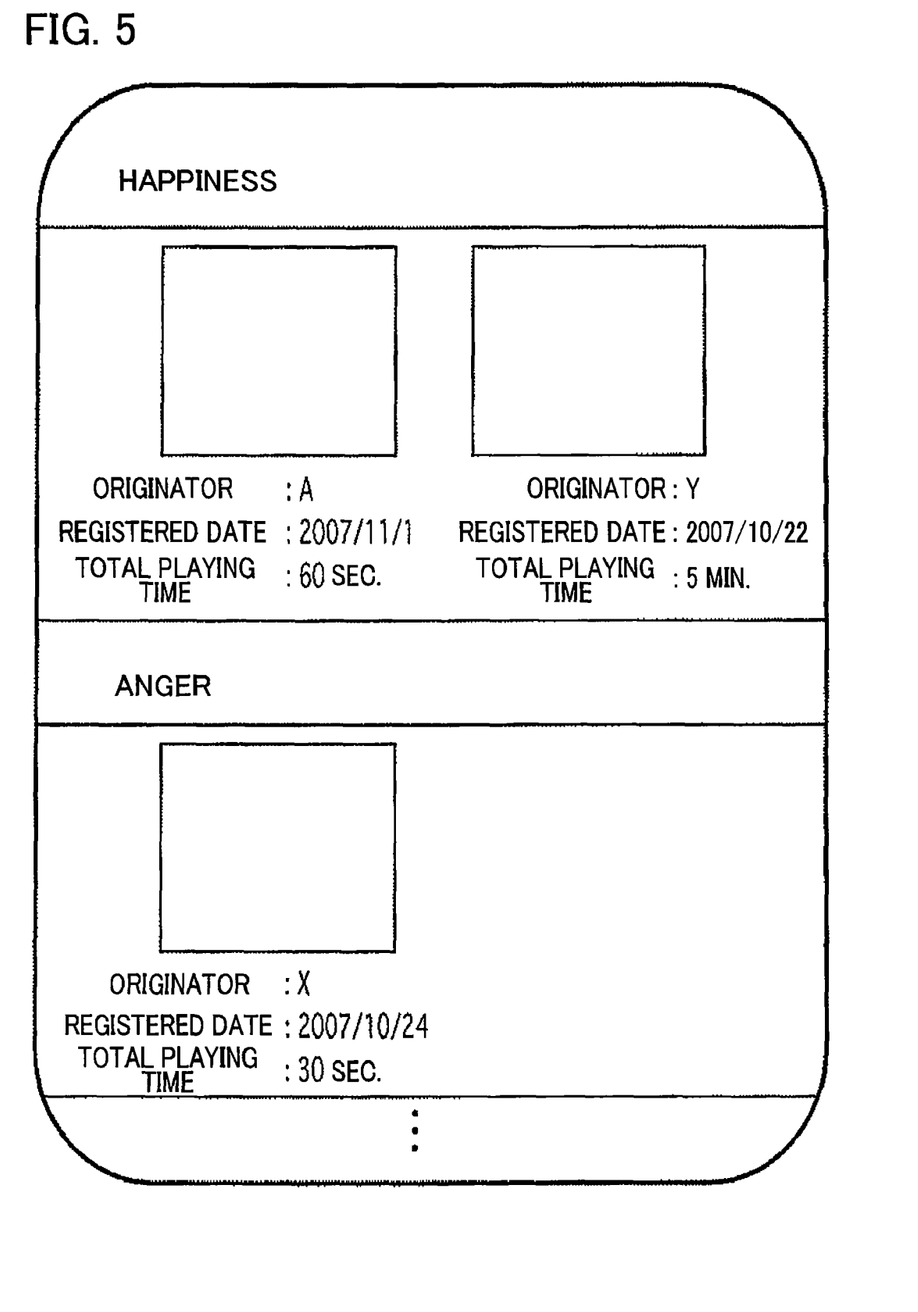
FIG. 5 is a diagram showing example screens displayed at a receiver communication terminal according to the embodiment of the present invention.

FIG. 5 is a diagram showing an example of a selection screen displayed at receiver communication terminal 10b in the present embodiment.

In a case in which receiver communication terminal 10b, upon receiving from message storage server 20 a message registration notification, connects to message storage server 20, screen data of a selection screen is received from message storage server 20, the selection screen showing, for each registered message, a set of an image, the originator, a registered date, and a total playing time of the registered message. These pieces of information are information showing attributes of each message, and a user, by looking at the displayed attribute information, decides which message to be downloaded.

In the example shown in FIG. 5, two messages showing happiness and one message showing anger are displayed, categorized by type of emotion. Scenes that best represent the emotion for each message are thumbnailed. Each thumbnailed scene corresponds to image data extracted from each message by data extractor 205. In a case in which one of the speech or video messages is selected by a user on the screen at receiver communication terminal 10b, the speech or video message is downloaded from message storage server 20 and is played.

In the case of an example shown in FIGS. 4 and 5, there are registered in message storage server 20 three messages for receiver communication terminal 10b. A registered message can be deleted by instruction from a user for doing so and can be downloaded for playing unless it is deleted. Therefore, a registered message is a message that can be downloaded by receiver communication terminal 10b. It is also to be noted that server 20 may delete a registered message according to prescribed rules.

Description will be next given of an operation of the emotion recognition message system according to the present embodiment. FIG. 6 is a sequence chart showing an operation of the emotion recognition message system. As shown in the figure, transmitter communication terminal 10a first receives input of a speech or video message (S1), whereby the operation of the emotion recognition message system is started. The input of the speech or video message is performed by a user of transmitter communication terminal 10a inputting the message via inputter 102 such as a microphone and a video camera.

The input speech or video message is transmitted to message storage server 20, while specifying, by transmitter communication terminal 10a, receiver communication terminal 10b as the destination of the message (S2a). Message storage server 20, upon receiving the message, stores it in storage device 202 (S2b). Storage of this message triggers an emotion recognition process.

Message storage server 20 causes emotion recognizer 204 to recognize emotion of the message, when the message is stored (S3). Emotion recognizer 204 assigns, to the corresponding message, emotion data which is a result of emotion recognition. Specifically, the emotion data is stored in association with the corresponding message in storage device 202.

Message storage server 20 causes confirmation requester 207 to transmit, to transmitter communication terminal 10a, data of the stored speech or video message and emotion data which is a result of emotion recognition performed in Step S3 as a confirmation request, so that the content of the speech or video message and the type of emotion indicated by emotion data are confirmed at transmitter communication terminal 10a (S4).

Transmitter communication terminal 10a, upon receiving from message storage server 20 the speech or video message and emotion data which is a result of emotion recognition, plays the speech or video message and displays the type of emotion represented by the received emotion data simultaneously (S5). This display screen is for prompting a user to confirm whether the type of the emotion recognized for the message agrees with the intention of the user. Therefore, when the playing of the message is completed, transmitter communication terminal 10a subsequently displays a screen for prompting the user to input whether the user agrees with the displayed result of emotion recognition at display 104.

In a case in which the user agrees with the displayed type of emotion for the speech or video message, transmitter communication terminal 10a transmits to message storage server 20 a response message indicating approval to the result of emotion recognition (approval response) (S6). On the other hand, in a case in which the user does not agree with the displayed result of emotion recognition, transmitter communication terminal 10a transmits to message storage server 20 a response message indicating disapproval of the result of recognition (disapproval response) (S6). In the latter case, message storage server 20 causes emotion recognizer 204 to perform the emotion recognition process by excluding the previous recognition result (S3) and then transmits the revised recognition result to transmitter communication terminal 10a along with the speech or video message (S4). Thus, message storage server 20 repeats the process from S3 to S5 until it receives an approval response from transmitter communication terminal 10a. Alternatively, the user may specify a desired type of emotion since, possibly, the user might not approve the result of the recognition even if emotion recognition is repeated for a number of times. As another alternative, the user may specify a desired type of emotion in a case in which the user disagrees with the first result of recognition, without repeating the emotion recognition process.

Message storage server 20, upon receiving an approval response from transmitter communication terminal 10a, determines that the corresponding speech or video message is registered (S7), thereby generating a notification message (registration notification) for receiver communication terminal 10b to notify that the speech or video message is registered (S8). In transmitting the notification message, message storage server 20 may also notify recognized emotion data together with registration of the message.

The message and emotion data stored in storage device 202 in Step S3 is never registered without approval from transmitter communication terminal 10a to the recognition result. Therefore, without approval from transmitter communication terminal 10a to the recognition result, the message stored in storage device 202 in Step S3 is not notified to receiver communication terminal 10b. Thus, according to the present embodiment, since emotion recognition of a message is performed by emotion recognizer 204, conformity of a message with the corresponding emotion can be ensured. Furthermore, since a result of the emotion recognition is notified to a correspondent after the result is approved by the transmitter of the message, the type of emotion that is very different from the transmitter's intention will not be conveyed to the correspondent. Thus, emotion data that is decided after balancing between subjectivity and objectivity is assigned to a message, which in turn promotes a smooth communication between the transmitter and the receiver of the user.

It is to be noted that storage device 202 may be configured so as to automatically delete a stored message for which approval from transmitter communication terminal 10a is not received for a certain period of time or longer as time out.

Receiver communication terminal 10b, upon receiving the registration notification message, connects to message storage server 20 so as to transmit an access request for accessing the speech or video message (S9).

Data extractor 205 of message storage server 20, upon receiving the access request from receiver communication terminal 10b, reads from storage device 202 a message for receiver communication terminal 10b and its corresponding emotion data. In a case in which the read message is a video message, data extractor 205 extracts an image of a scene that best represents the type of emotion indicated by the emotion data recognized by emotion recognizer 204. In a case in which the read message is a speech message, data extractor 205 reads, from the memory, a set of characters or an image that is suited for the emotion data. In a case in which there is stored more than one message for receiver communication terminal 10b in storage device 202, data extractor 205 performs extraction of an image or reads a set of characters or an image for each message (S10).

Generator 206 of message storage server 20 uses the image passed from data extractor 205 and attribute information of a message obtained from storage device 202 such as its registered date, originator, total playing time to generate screen data representing an image of a selection screen to be displayed at receiver communication terminal 10b. The selection screen displays messages by type of emotion based on emotion data assigned to each message (S11). It is to be noted that the image extracted by data extractor 205 is an image corresponding to emotion data recognized by emotion recognizer 204 for each registered message. Therefore, the extracted image is regarded as a part of attribute information.

Message storage server 20 transfers the generated screen data of the selection screen to receiver communication terminal 10b (S12).

Receiver communication terminal 10b, upon receiving from message storage server 20 the screen data, displays an image represented by the screen data (S13).

The user of receiver communication terminal 10b, by looking at the displayed screen, inputs a selection result of an image of a message which the user wishes to have played. The signal of the input selection result is transmitted as a download request of the selected message to message storage server 20 (S14). The download request includes information specifying which message is to be downloaded.

Message storage server 20, upon receiving the download request, reads out data of the relevant speech or video message from storage device 202, to transmit the message to receiver communication terminal 10b (S15).

Receiver communication terminal 10b, upon receiving the data of the speech or video message, plays the message (S16).

Modification

Figure 7:
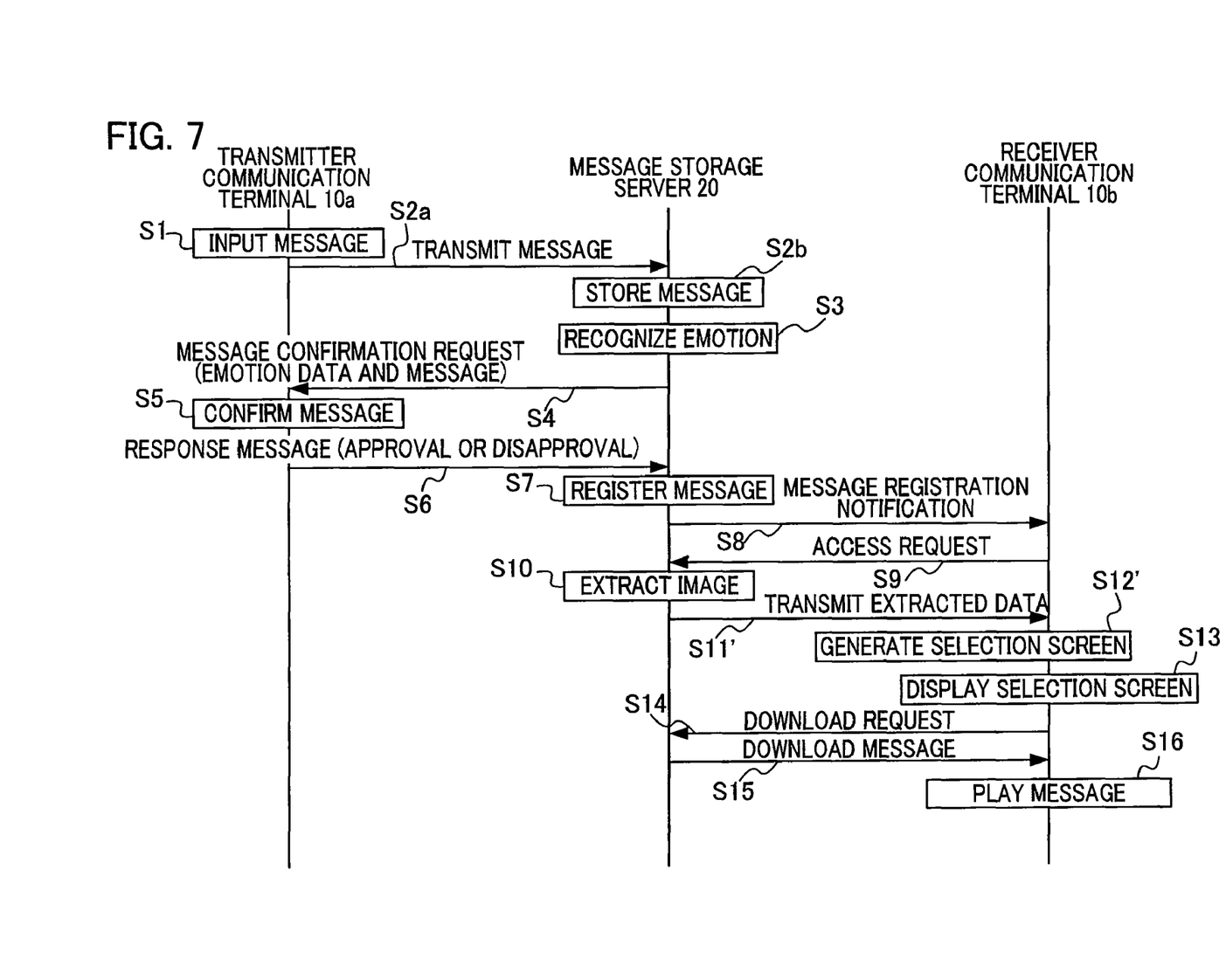
FIG. 7 is a sequence chart showing an operation according to a modification of the embodiment.

In the above embodiment, generator 206 is provided at message storage server 20, but receiver communication terminal 10b may instead generate screen data of the selection screen. FIG. 7 is a sequence chart showing an operation of the emotion recognition system in such a case. In this case, when receiver communication terminal 10b transmits an access request to message storage server 20 (S9) in response to the message registration notification (S8), data extractor 205 of message storage server 20 extracts an image that suits the type of emotion indicated by the emotion data recognized by emotion recognizer 204 (S10). Subsequently, message storage server 20, without performing generation of a selection screen, transmits to receiver communication terminal 10b the extracted data, emotion data assigned to a message, and information on attributes of the message such as its registered date, the originator, and the total playing time of the message (S11'). At receiver communication terminal 10b, controller 102 generates a screen data based on the received data, for display on display 104 (S12', S13). In this case, controller 102 of receiver communication terminal 10b performs categorization and display of messages according to types of emotion.

In a case in which there is stored more than one message for receiver communication terminal 10b in storage device 202, message storage server 20 performs extraction of an image for each message and transmits the extracted data and the information on the attributes of the message for each message to receiver communication terminal 10b. Controller 102 of receiver communication terminal 10b generates, based on the received data, a selection screen on which plural messages are shown by type of emotion.

In the above embodiment, emotion recognition is triggered when a message received from transmitter communication terminal 10a is stored in storage device 202 of message storage server 20. Alternatively, emotion recognition may be triggered when inputter-outputter 201 of message storage server 20 receives a message transmitted from transmitter communication terminal 10a. In this case, it may be configured so that, at a point in time at which a confirmation request is transmitted to transmitter communication terminal 10a, the message and its emotion data are not stored in storage device 202. The message and its emotion data may be stored in storage device 202 after message storage server 20 receives a request for registration (i.e., approval response) from transmitter communication terminal 10a at a later time.

In the above embodiment, in Step S4 in FIG. 6, confirmation requester 207 of message storage server 20 transmits emotion data, which is a result of emotion recognition performed by emotion recognizer 204, together with a message received in Step S2a to transmitter communication terminal 10a. Alternatively, it may be configured so that confirmation requestor 207 does not transmit the message itself to transmitter communication terminal 10a, but transmits only emotion data. In this case, confirmation requestor 207 may transmit emotion data together with information identifying the corresponding message. Since a message is speech data or video data, multiple transmission of the message between transmitter communication terminal 10a and message storage server 20 places excess burden on the communication system. However, according to this modification, such a burden can be reduced.

In the above embodiment, data extractor 205 of message storage server 20 extracts an image after receiver communication terminal 10b transmits an access request to message storage server 20 (S9 in FIG. 6). Alternatively, data extractor 205 may extract an image upon registration of a message data, so that a selection screen image is generated right away by generator 206. Specifically, data extractor 205 may extract an image concurrently with transmission of a registration notification message to receiver communication terminal 10b. According to this configuration, the time required is reduced since receiver communication terminal 10b transmits an access request to message storage server 20 until receiver communication terminal 10b displays a selection screen.

In the embodiment, the selection screen shown in FIG. 5 is configured so that messages are displayed by different types of emotion, but the present invention is not limited thereto. Alternatively, the messages may be listed sorted by registered date and time or by the originator of the message.

In the above embodiment, data extractor 205 and generator 206 are provided with message storage server 20. Alternatively, data extractor 205 and generator 206 may be provided at another server. That is, a message storage server may be dedicated to storage of speech or video messages and an emotion recognition process, and a data extractor and a generator may be configured as Web servers. This enables simplification of a message storage server and facilitates easy access from a communication terminal by using a general interface such as a Web interface.

In the above embodiment, receiver communication terminal 10b plays only a speech or video message in Step S16. Alternatively, emotion data may be additionally displayed along with playing of a message. Specifically, by dividing the screen of a communication terminal into two parts, speech or video is played and shown on one screen, and the corresponding emotion data may be displayed on the other screen. According to this modification, a type of emotion of each scene of a message can be displayed simultaneously in the course of message playing. In this case, for each of plural pieces of emotion data recognized by emotion recognizer 204, its recognition point is preferably stored in storage device 202 in association with corresponding piece of emotion data.

In the above embodiment, types of emotion to be recognized are set by message storage server 20. Alternatively, receiver communication terminal 10b may specify a type of emotion to be recognized. That is, a communication terminal may log-in the message storage server to request it to recognize emotion from a scene relating only to "pleasure" or to recognize as many types of emotions as specified by a user. According to this modification, it is possible to perform emotion recognition focusing on types of emotion which the receiver user wishes.

In the above embodiment, data extractor 205 obtains a set of characters or an image corresponding to emotion data for speech messages. Alternatively, data extractor 205 may extract a part of speech data that best shows the type of emotion recognized by emotion recognizer 204 and may pass the extracted speech data over to generator 206. In this case, speech data corresponding to the recognition point of the emotion data is extracted, and data extractor 205 may extract a phrase or a word for which the play period includes the recognition point.

What is claimed is:

1. A message system having a message storage server and at least two mobile communication terminals,
   each of the at least two mobile communication terminals comprising:
   a transmitter-receiver that transmits data to, and receives data from, the message storage server;
   a display that displays an image;
   an input receiver that receives input of speech or video from a user; and
   a controller that controls each of the transmitter-receiver, the display, and the input receiver,
   wherein the controller, in a case in which a message containing speech or video intended for another mobile communication terminal is received by the input receiver, is configured to transmit the message to the message storage server via the transmitter-receiver without any emotion recognition of the message being performed;
   the message storage server comprising:
   a message receiver that receives, from a mobile communication terminal, the message for another mobile communication terminal;
   a storage device that stores the message received by the message receiver;
   an emotion recognizer that performs emotion recognition on the message and that assigns emotion data indicating the recognized emotion to the message; and
   a confirmation request transmitter that transmits, as a confirmation request, emotion data assigned by the emotion recognizer to the mobile communication terminal that has transmitted the message,
   wherein the controller, upon receiving from the message storage server the confirmation request, displays an image corresponding to the received emotion data on the display; and
   wherein the emotion recognizer is further configured, in response to receipt from the mobile communication terminal of a response message indicating disapproval of the emotion data, to perform a second emotion recognition on the message, and assign revised emotion data indicating a second recognized emotion to the message, and the confirmation request transmitter further configured to transmit, as a second confirmation request, the second emotion data to the mobile communication terminal that has transmitted the message.

2. A mobile communication terminal that connects to a mobile communication system having a message storage server and that communicates with another mobile communication terminal, the mobile communication terminal comprising:
   a transmitter-receiver configured to transmit a message containing speech or video absent any emotion recognition information provided by the mobile communication terminal, the message transmitted for receipt by the message storage server, which is configured to register the message received from the mobile communication terminal after performing emotion recognition on the received message and assign emotion data indicating the recognized emotion to the received message;
   a display that displays an image;
   an input receiver that receives input of speech or video from a user; and
   a controller that controls each of the transmitter-receiver, the display, and the input receiver,
   wherein the controller, in a case in which the message containing speech or video for another mobile communication terminal is received by the input receiver, transmits the message to the message storage server via the transmitter-receiver;
   wherein the controller, upon receiving, as a confirmation request, emotion data for the transmitted message from the message storage server, displays a first image corresponding to the received emotion data on the display; and
   wherein the controller, upon receiving, via the input receiver, an input instruction indicating that the user agrees or disagrees with a type of the emotion indicated by the image displayed on the display, transmits via the transmitter-receiver to the message storage server an approval response indicating approval of the emotion data or a disapproval response indicating disapproval of the emotion data, respectively; and
   wherein the controller, upon receipt from the message storage server of revised emotion data for the transmitted message, displays on the display, for approval or disapproval, a second image corresponding to the revised emotion data, wherein the revised emotion data is received from the message storage server as a subsequent confirmation request responsive to the disapproval response.

3. A mobile communication terminal according to claim 2,
   wherein the controller, upon receiving via the transmitter-receiver from the message storage server a registration notification that notifies registration of a message for the mobile communication terminal in the message storage server, transmits an access request for the registered message via the transmitter-receiver to the message storage server;
   wherein the controller, upon receiving via the transmitter-receiver from the message storage server, screen data representing a selection screen that displays message information indicating attributes of the registered message, displays the selection screen represented by the screen data on the display, the selection screen displaying the message information of at least one message that can be downloaded by the mobile communication terminal, with the message information being displayed after being sorted according to a type of emotion indicated by the emotion data of the message; and
   wherein the controller, when one of the at least one message is selected from the selection screen, transmits a download request for the selected message to the message storage server.

4. A mobile communication terminal according to claim 2,
   wherein the controller, upon receiving via the transmitter-receiver from the message storage server a registration notification that notifies registration of a message for the mobile communication terminal in the message storage server, transmits an access request for the registered message via the transmitter-receiver to the message storage server;
   wherein the controller, upon receiving via the transmitter-receiver from the message storage server, screen data representing a selection screen that displays message information of at least one message that can be downloaded by the mobile communication terminal, with the message information indicating attributes of the registered message, displays the selection screen represented by the screen data on the display, the message information including an image that best represents the emotion indicated by the emotion data assigned to the message; and wherein the controller, when one of the at least one message is selected from the selection screen, transmits a download request for the selected message to the message storage server.

5. A mobile communication terminal according to claim 4, wherein in the selection screen, the message information of the at least one message that can be downloaded by the mobile communication terminal is displayed after being sorted according to a type of emotion indicated by the emotion data of the message.

6. A message storage server of a mobile communication system for relaying communication between at least two mobile communication terminals, the message storage server comprising:

a message receiver that receives from a first mobile communication terminal a message containing speech or video for a second mobile communication terminal absent any emotion recognition information provided by the first mobile communication terminal;

a storage device that stores the message received by the message receiver;

an emotion recognizer that performs emotion recognition on the message and that assigns emotion data indicating the recognized emotion to the message; and a confirmation request transmitter that transmits, as a confirmation request, emotion data assigned by the emotion recognizer to the first mobile communication terminal that has transmitted the message;

wherein the emotion recognizer is further configured, in response to receipt from the mobile communication terminal of a response message indicating disapproval of the emotion data, to perform a second emotion recognition on the message, and assign revised emotion data indicating a second recognized emotion to the message, and the confirmation request transmitter is further configured to transmit, as a second confirmation request, the revised emotion data to the mobile communication terminal that has transmitted the message.

7. A message storage server according to claim 6, further comprising:

a registration notifier that, upon receiving from the first mobile communication terminal an approval response indicating approval to the emotion data, transmits to the second mobile communication terminal a registration notification of the message that corresponds to the approved emotion data and that is stored in the storage device.

8. A message storage server according to claim 7, further comprising:

a first generator that, upon receiving an access request from the second mobile communication terminal as a response to the registration notification, generates screen data representing a selection screen that displays message information indicating attributes of the stored message; and a screen data transmitter that transmits the screen data generated by the first generator to the second mobile communication terminal, wherein the first generator generates, as the selection screen, a screen that displays the message information of the message that can be downloaded by the second mobile communication terminal, after sorting the message information according to a type of emotion indicated by the emotion data of the message.

9. A message storage server according to claim 7, further comprising:

an image extractor that, upon receiving an access request from the second mobile communication terminal in response to the registration notification, extracts from the video data of the message an image that best represents emotion indicated by the emotion data corresponding to the message, in a case in which the stored message is a message by video;

a second generator that generates screen data representing a selection screen that displays an image extracted by the image extractor as at least a part of message information indicating attributes of the stored message; and a screen data transmitter that transmits the screen data generated by the second generator to the second mobile communication terminal.

10. A message storage server according to claim 9, wherein the second generator generates, as the selection screen, a screen that displays the message information of the message that can be downloaded by the second mobile communication terminal, after sorting the message information according to a type of emotion indicated by the emotion data of the message.

* * * * *